United States Patent
Natsumi et al.

(10) Patent No.: US 11,220,276 B2
(45) Date of Patent: Jan. 11, 2022

(54) TRAVEL CONTROL DEVICE, VEHICLE, AND TRAVEL CONTROL METHOD

(71) Applicant: ISUZU MOTORS LIMITED, Tokyo (JP)

(72) Inventors: Kouki Natsumi, Fujisawa (JP); Naoki Takahashi, Fujisawa (JP); Satoshi Hayashi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/755,609

(22) PCT Filed: Oct. 12, 2018

(86) PCT No.: PCT/JP2018/038049
§ 371 (c)(1),
(2) Date: Apr. 13, 2020

(87) PCT Pub. No.: WO2019/074086
PCT Pub. Date: Apr. 18, 2019

(65) Prior Publication Data
US 2020/0331498 A1  Oct. 22, 2020

(30) Foreign Application Priority Data
Oct. 12, 2017  (JP) .............................. JP2017-198766

(51) Int. Cl.
*B60W 40/072* (2012.01)
*B60W 40/076* (2012.01)
*B60W 60/00* (2020.01)
*B60W 30/18* (2012.01)

(52) U.S. Cl.
CPC .. *B60W 60/0025* (2020.02); *B60W 30/18072* (2013.01); *B60W 30/18145* (2013.01);
(Continued)

(58) Field of Classification Search
CPC ....... B60W 60/0025; B60W 30/18072; B60W 30/18145; B60W 40/072; B60W 40/076;
(Continued)

(56) References Cited

U.S. PATENT DOCUMENTS

2018/0118206 A1  5/2018 Yamakado et al.

FOREIGN PATENT DOCUMENTS

| JP | 2006-137235 A | 6/2006 |
|---|---|---|
| JP | 2006-168509 A | 6/2006 |

(Continued)

OTHER PUBLICATIONS

English_Translation_JP2006137235A (Year: 2006).*
(Continued)

*Primary Examiner* — Peter D Nolan
*Assistant Examiner* — Ashley L Redhead, Jr.
(74) *Attorney, Agent, or Firm* — Brundidge & Stanger, P.C.

(57) ABSTRACT

This travel control device includes: a road determining unit which determines whether a road including a downward slope along which a vehicle is traveling includes a first curved road and a second curved road; and a travel control unit which, if the road determining unit has determined that the road contains the first curved road and the second curved road, causes the vehicle, when being caused to travel in such a way as to maintain a target speed, to decelerate at a curved road entry side of the first curved road and to coast from a curved road exit side of the first curved road, such that the vehicle can pass through the first curved road.

6 Claims, 5 Drawing Sheets

(52) U.S. Cl.
CPC ........ *B60W 40/072* (2013.01); *B60W 40/076* (2013.01); *B60W 2520/00* (2013.01)

(58) Field of Classification Search
CPC ......... B60W 2520/00; B60W 2720/10; B60W 30/18109; B60W 2552/15; B60W 2552/30; B60W 2556/50; B60W 30/143; B60T 2210/24; B60T 2201/16; B60T 2210/22; B60T 10/02; B60T 7/22; B60T 2210/30; B60T 2201/10; B60T 2201/02; B60T 7/18; Y02T 10/60; F16D 57/04; F02D 29/02

See application file for complete search history.

(56) References Cited

FOREIGN PATENT DOCUMENTS

| | | | | |
|---|---|---|---|---|
| JP | 2006137235 | A | * | 6/2006 |
| JP | 2008-195226 | A | | 8/2008 |
| JP | 2015-051646 | A | | 3/2015 |
| JP | 2015051646 | A | * | 3/2015 |
| JP | 2016-182934 | A | | 10/2016 |

OTHER PUBLICATIONS

English_Translation_JP2015051646A (Year: 2015).*
International Search Report from International Application No. PCT/JP2018/038049 dated Dec. 18, 2018.

* cited by examiner

TRAVEL CONTROL DEVICE, VEHICLE, AND TRAVEL CONTROL METHOD

TECHNICAL FIELD

The present disclosure relates to a travel control device, a vehicle, and a travel control method.

BACKGROUND ART

Hitherto, techniques for controlling autocruise traveling (driven traveling) in which a vehicle velocity is maintained at a target velocity set in advance have been developed (see, for example, Patent Literature (hereinafter, abbreviated as PTL) 1).

CITATION LIST

Patent Literature

PTL 1
Japanese Patent Application Laid-Open No. 2006-168509

SUMMARY OF INVENTION

Technical Problem

In driven traveling, a vehicle autonomously travels while referring to position information, map data, and the like of the Global Positioning System (GPS). Accordingly, the vehicle is capable of realizing fuel-efficient traveling.

However, a conventional vehicle may wastefully consume energy and may be incapable of realizing fuel-efficient traveling on a road with successive curved paths, such as a mountain road, even if the road has a downward slope.

For example, in a case where a vehicle travels along two successive curved paths with a downward slope, the vehicle decelerates so as to be capable of passing through the first curved path (for example, so as to be capable of safely passing without causing overrun or the like). After that, the vehicle accelerates by driven traveling to reach a target velocity, and then decelerates again so as to be capable of passing through the second curved path. In this way, even on a downward slope, the vehicle accelerates by driven traveling in a case where there are successive curves, and thus may be incapable of realizing fuel-efficient traveling.

An object of the present disclosure is to provide a travel control device, a vehicle, and a travel control method that are capable of realizing fuel-efficient traveling even on a road with successive curved paths and a downward slope.

Solution to Problem

A travel control device according to one aspect of the present invention includes: a road determining section that determines whether or not a road on which a vehicle is to travel and which includes a downward slope includes a first curved path and a second curved path; and a travel control section that, in a case where the road determining section determines that the road includes the first curved path and the second curved path, causes the vehicle which has been caused to travel so as to maintain a target velocity to decelerate on a curved path entrance side of the first curved path such that the vehicle is capable of passing through the first curved path, and causes the vehicle to perform coasting traveling from a curved path exit side of the first curved path.

A vehicle according to one aspect of the present disclosure includes the travel control device described above.

A travel control method according to one aspect of the present disclosure: determining whether or not a road on which a vehicle is to travel and which includes a downward slope includes a first curved path and a second curved path; and in a case where it is determined that the road includes the first curved path and the second curved path, causing the vehicle which has been caused to travel so as to maintain a target velocity, to decelerate on a curved path entrance side of the first curved path such that the vehicle is capable of passing through the first curved path, and causing the vehicle to perform coasting traveling from a curved path exit side of the first curved path.

Advantageous Effects of Invention

According to the present disclosure, fuel-efficient traveling can be realized even on a road with successive curved paths and a downward slope.

DESCRIPTION OF EMBODIMENTS

Hereinafter, one embodiment of the present disclosure will be described in detail with reference to the drawings. First, the configuration of a vehicle including travel control device 100 according to this embodiment will be described.

Figure 1:
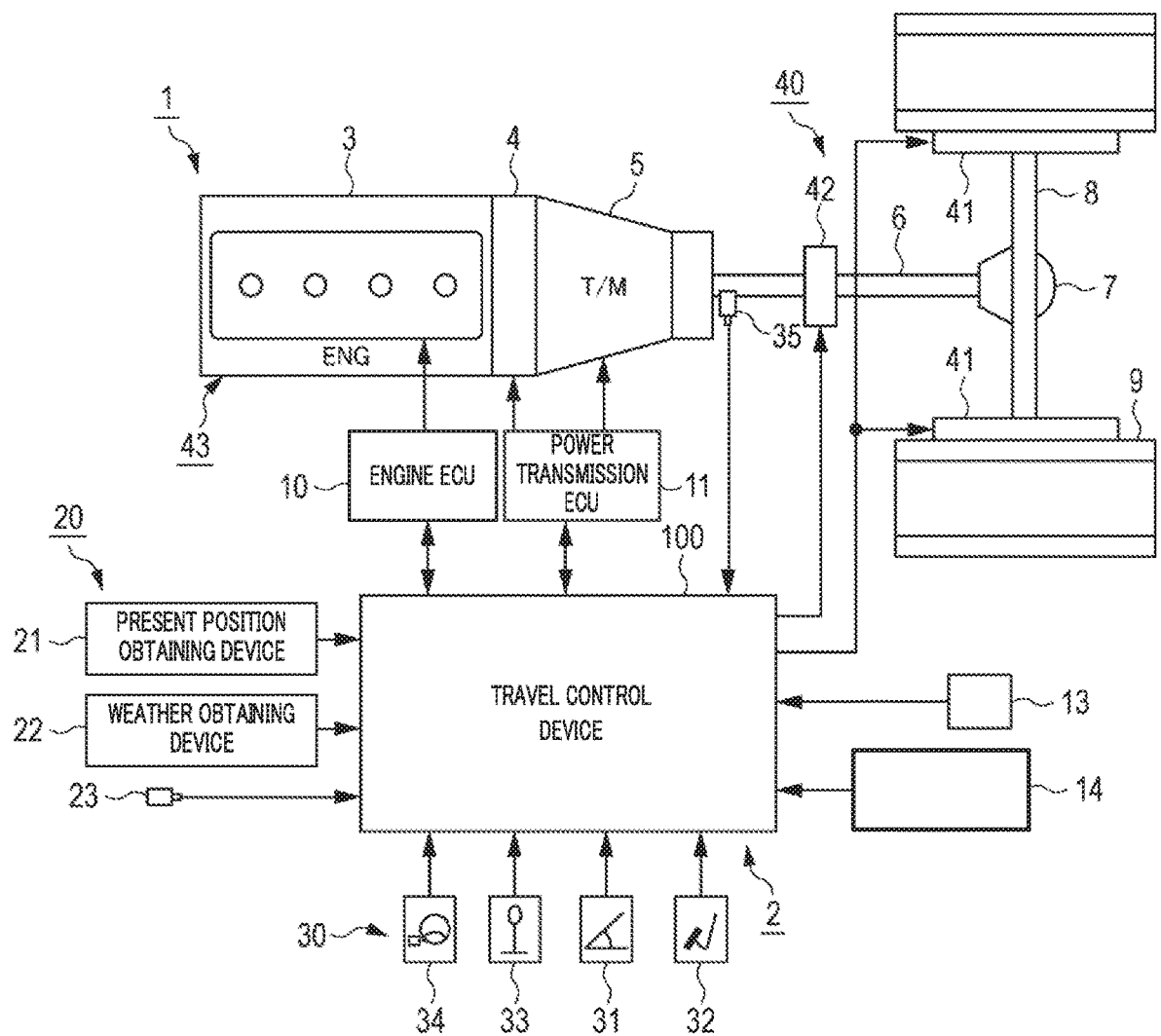
FIG. 1 is a block diagram illustrating an example of the configuration of a vehicle including a travel control device according to an embodiment.

FIG. 1 is a block diagram illustrating an example of the configuration of vehicle 1 including travel control device 100 according to this embodiment. Here, illustration and description will be given of the parts related to travel control device 100.

Vehicle 1 illustrated in FIG. 1 is, for example, a large-size vehicle, such as a truck, in which a series four-cylinder diesel engine is mounted.

As illustrated in FIG. 1, vehicle 1 includes, as components of a driving system for causing the vehicle to travel, engine 3, clutch 4, gearbox (transmission) 5, thrust shaft (propeller shaft) 6, differential device (differential gear) 7, driving shaft (drive shaft) 8, and wheels 9.

The power of engine 3 is transmitted to gearbox 5 via clutch 4, and the power transmitted to gearbox 5 is further transmitted to wheels 9 via thrust shaft 6, differential device 7, and driving shaft 8. Accordingly, the power of engine 3 is transmitted to wheels 9 and vehicle 1 travels.

In addition, vehicle 1 includes, as a component of a brake system for stopping the vehicle, brake device 40. Brake device 40 includes foot brakes 41 that apply resistance force to wheels 9, retarder 42 that applies resistance force to thrust shaft 6, and auxiliary brake 43, such as an exhaust brake, that applies a load to engine 3.

Furthermore, vehicle 1 includes, as a component of a control system for controlling traveling of vehicle 1, autonomous travel device 2. Autonomous travel device 2 is a device that controls engine 3, clutch 4, gearbox 5, and brake device 40 to cause vehicle 1 to autonomously travel, and includes plural control devices.

Specifically, autonomous travel 2 includes engine ECU (engine control unit) 10, power transmission ECU (power transmission control device) 11, target vehicle velocity setting device 13, value-of-increase/decrease setting device 14, travel condition obtaining device 20, vehicle information obtaining device 30, and travel control device 100. Engine ECU 10, power transmission ECU 11, and travel control device 100 are connected to each other by an on-vehicle network and are capable of transmitting/receiving necessary data or control signals to/from each other.

Engine ECU 10 controls an output of engine 3. Power transmission ECU 11 controls connection/disconnection of clutch 4 and changing gears in gearbox 5.

Target vehicle velocity setting device 13 sets a target velocity of vehicle 1 during driven traveling to travel control device 100. Value-of-increase/decrease setting device 14 sets a value of decrease in velocity and a value of increase in velocity of vehicle 1 during driven traveling to travel control device 100. The target velocity, the value of decrease in velocity, and the value of increase in velocity are parameters that are used for autonomous traveling of vehicle 1.

Target vehicle velocity setting device 13 and value-of-increase/decrease setting device 14 include an information input interface, such as a display with a touch screen, disposed in a dashboard of a driver's seat (not illustrated), for example, and receives settings of the foregoing parameters from a driver. The target velocity, the value of decrease in velocity, and the value of increase in velocity are referred to as "set information" as appropriate.

Travel condition obtaining device 20 obtains travel conditions indicating road conditions and a present position of vehicle 1 and outputs the travel conditions to travel control device 100. For example, travel condition obtaining device 20 includes present position obtaining device 21, which is a receiver of a GPS system, weather obtaining device 22 that obtains weather during traveling, and surroundings sensor 23 that detects a distance from and a difference in vehicle velocity from a vehicle around vehicle 1, such as a vehicle traveling in front of or beside vehicle 1.

Vehicle information obtaining device 30 obtains vehicle information indicating operations performed by the driver and a state of vehicle 1 and outputs the vehicle information to travel control device 100. For example, vehicle information obtaining device 30 includes an accelerator sensor 31 that detects the amount of depression of an accelerator pedal, a brake switch 32 that detects whether or not a brake pedal has been pressed, a shift lever 33, a turn signal switch 34, and a vehicle velocity sensor 35 that detects a velocity of vehicle 1.

Travel control device 100 generates a travel schedule including driven traveling (autocruise traveling) and coasting traveling, on the basis of the above-described set information, travel conditions, and vehicle information. Travel control device 100 controls individual parts of vehicle 1 such that vehicle 1 travels in accordance with the generated travel schedule. In this embodiment, driven traveling is autocruise traveling in which the velocity of vehicle 1 is maintained within a velocity range from a velocity higher than a lower limit velocity, which is set to be low relative to a target velocity, to a velocity lower than an upper limit velocity, which is set to be high relative to the target velocity.

Coasting traveling includes engine brake traveling in which vehicle 1 travels by applying an engine brake using driven rotation of engine 3 without a power transmission path between engine 3 and wheels 9 being cut off, and neutral coasting traveling (hereinafter also referred to as "N coasting") in which vehicle 1 travels with the power transmission path between engine 3 and wheels 9 being cut off. In engine brake traveling and N coasting, fuel injection of engine 3 is stopped.

Figure 2:
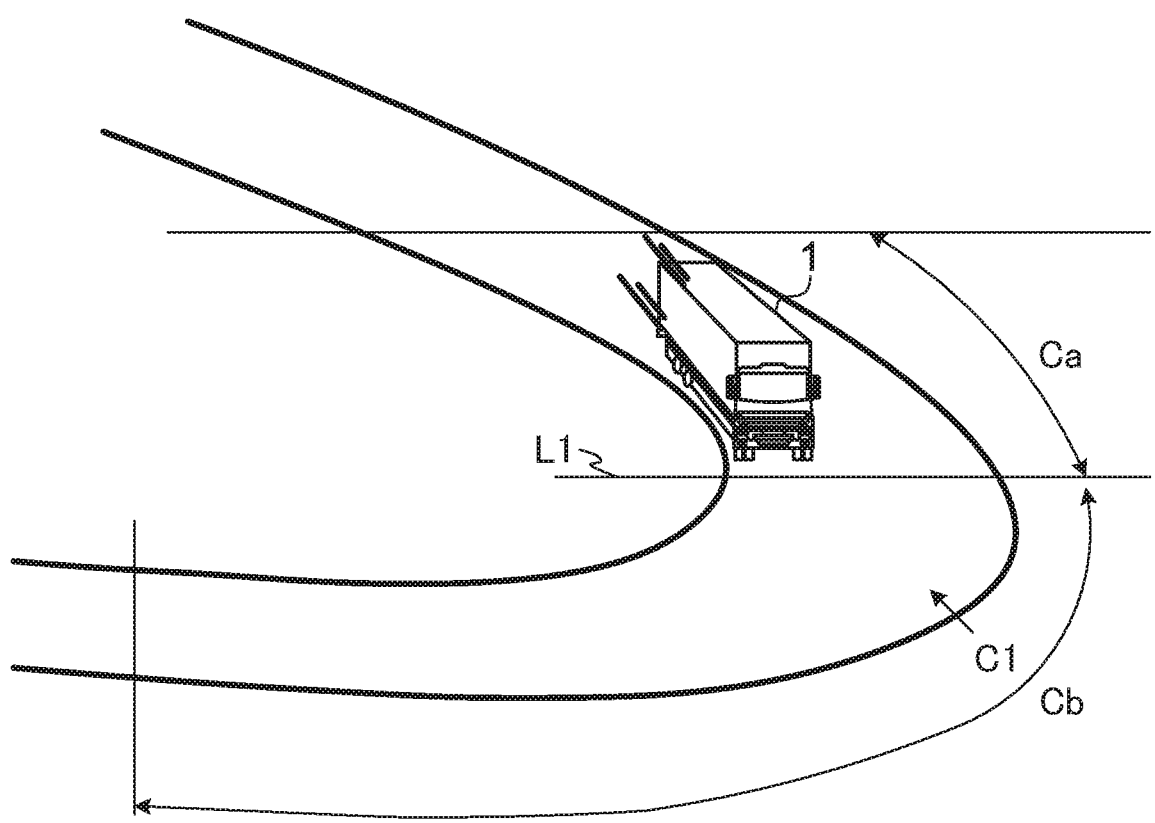
FIG. 2 is a diagram for describing an example of a curved path entrance side and a curved path exit side.

FIG. 2 is a diagram for describing an example of a curved path entrance side and a curved path exit side. FIG. 2 illustrates curved path C1 and vehicle 1.

Line L1 illustrated in FIG. 2 indicates a "certain position of curved path C1". The certain position of curved path C1 may be, for example, a position at which a road length in a region on the curved path entrance side of curved path C1 is equal (or substantially equal) to a road length in a region on the curved path exit side of curved path C1.

The "curved path entrance side" is a region from the certain position of curved path C1 to the entrance side of curved path C1 and includes, for example, a region before curved path C1 in a vehicle traveling direction and a region near the entrance of curved path C1. For example, double sided arrow Ca illustrated in FIG. 2 indicates the curved path entrance side. Similarly, the "curved path exit side" is a region from the certain position of curved path C1 to the exit side of curved path C1 and includes, for example, a region after curved path C1 in the vehicle traveling direction and a region near the exit of curved path C1. For example, double sided arrow Cb illustrated in FIG. 2 indicates the curved path exit side. The certain position of curved path C1 may be, for example, a clipping point (acceleration starting point) of vehicle 1.

Figure 3:
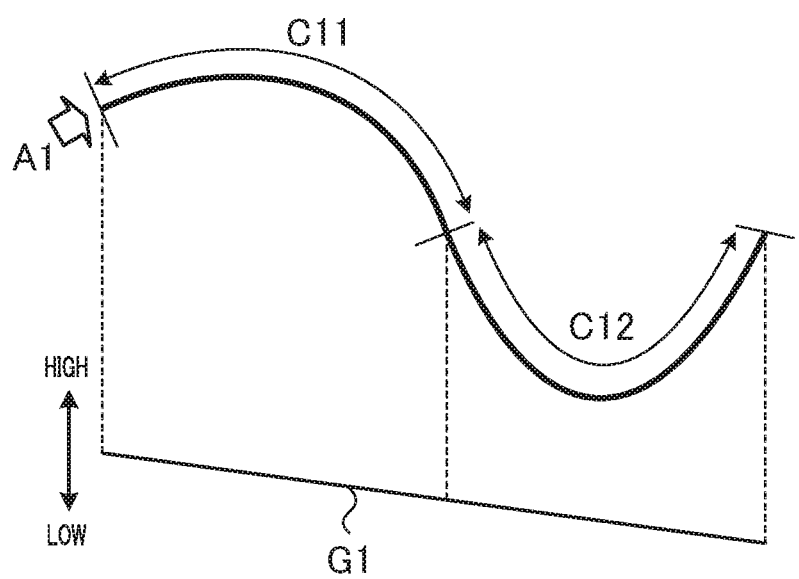
FIG. 3 is a diagram illustrating an example of successive curved paths.

FIG. 3 is a diagram illustrating an example of successive curved paths. FIG. 3 illustrates curved path C11 and curved path C12 following curved path C11. Curved path C12 has a smaller radius of curvature than curved path C11. Arrow A1 in FIG. 3 indicates a traveling direction of vehicle 1.

FIG. 3 illustrates graph G1 showing gradients (high or low) of curved paths C11 and C12. As shown in graph G1, curved paths C11 and C12 along which vehicle 1 travels have a downward slope.

In the example in FIG. 3, curved paths C11 and C12 have the same downward gradient (the inclination of graph G1 is constant). Alternatively, curved paths C11 and C12 may have different downward gradients.

In the example in FIG. 3, curved path C11 is a right-hand curve and curved path C12 is a left-hand curve in the vehicle traveling direction. Alternatively, curved paths C11 and C12 may be curved in the same direction. For example, first curved path C11 may be a right-hand curve and also second curved path C12 may be a right-hand curve in the vehicle traveling direction.

Figure 4:
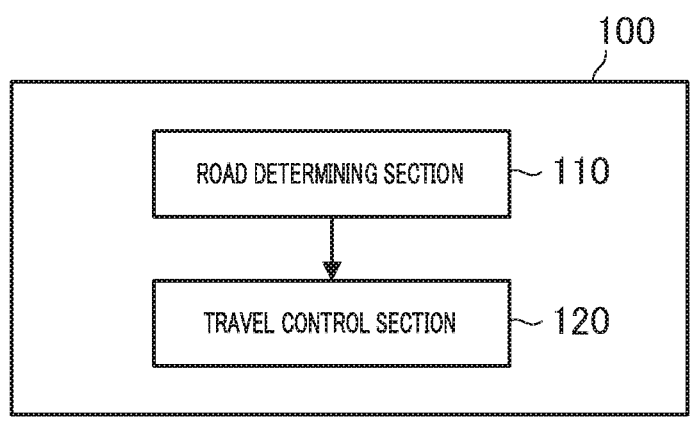
FIG. 4 is a block diagram illustrating an example of the configuration of the travel control device.

FIG. 4 is a block diagram illustrating an example of the configuration of travel control device 100. As illustrated in FIG. 4, travel control device 100 includes road determining section 110 and travel control section 120.

Road determining section 110 determines whether or not a road on which vehicle 1 is to travel and which includes a downward slope includes a first curved path and a second curved path that has a smaller radius of curvature than the first curved path.

For example, road determining section 110 determines whether or not a road on which vehicle 1 is to travel includes curved paths C11 and C12 illustrated in FIG. 3, on the basis of the map data stored in a memory (not illustrated) and the present position of vehicle 1.

Travel control section 120 generates a travel schedule including driven traveling and N coasting, and causes vehicle 1 to travel in accordance with the generated travel schedule on the basis of the present position of vehicle 1.

In a case where road determining section 110 determines that the road includes the first curved path and the second curved path, travel control section 120 causes vehicle 1, vehicle 1 being caused to travel so as to maintain a target velocity in accordance with the travel schedule, to decelerate on the curved path entrance side such that vehicle 1 is capable of passing through the first curved path. Subsequently, travel control section 120 causes the vehicle to accelerate by N coasting from the curved path exit side of the first curved path such that the vehicle is capable of passing through the second curved path. In other words, in a case where road determining section 110 determines that the road includes the first curved path and the second curved path, travel control section 120 does not control the velocity of vehicle 1 to the target velocity. Travel control section 120 causes vehicle 1 that is traveling at the target velocity to decelerate such that vehicle 1 is capable of passing through the first curved path and causes vehicle 1 to accelerate by N coasting.

Figure 5:
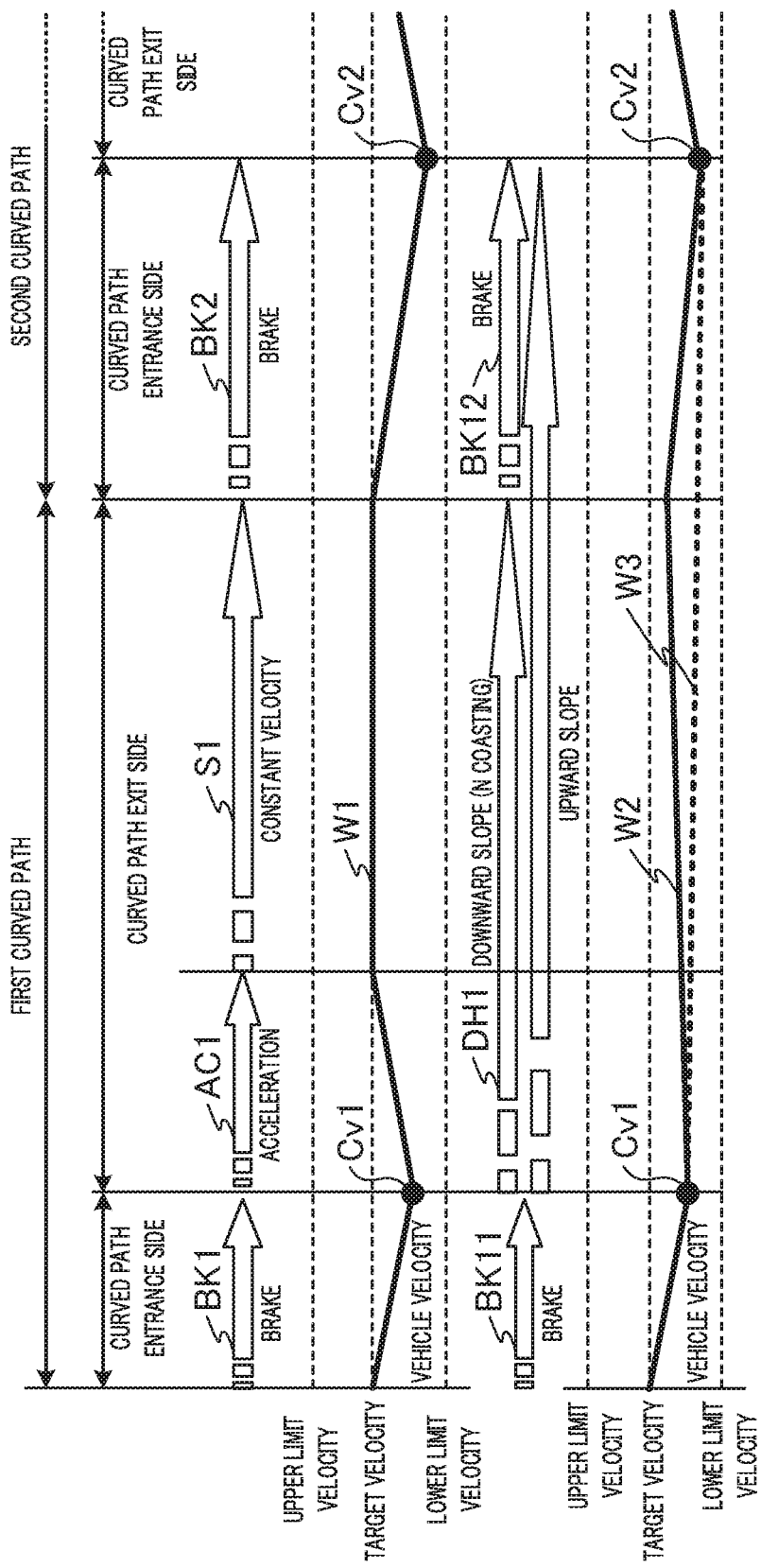
FIG. 5 is a diagram illustrating an example of a travel schedule for describing an operation example of a travel control section.

FIG. 5 is a diagram illustrating an example of a travel schedule for describing an operation example of travel control section 120. Waveform W1 illustrated in FIG. 5 indicates changes in the velocity of vehicle 1 that are based on travel control by a travel control section (hereinafter referred to as travel control section A) that causes vehicle 1 traveling along a curved path with a downward slope to accelerate to a target velocity. Waveform W2 indicates changes in the velocity of vehicle 1 that are based on travel control by travel control section 120 according to the present disclosure. It is assumed that, for example, vehicle 1 travels on a straight road with a downward slope and enters a first curved path with a downward slope. It is also assumed that vehicle 1 passes through the first curved path and then travels along a second curved path with a downward slope, the radius of curvature of the second curved path being smaller than that of the first curved path.

The "target velocity" illustrated in FIG. 5 indicates the target velocity of vehicle 1 that travels in accordance with the travel schedule. The target velocity is set to travel control sections A and 120 by target vehicle velocity setting device 13.

The "upper limit velocity" illustrated in FIG. 5 indicates the upper limit velocity of vehicle 1 that travels in accordance with the travel schedule. The upper limit velocity is calculated on the basis of the following equation 1.

Upper limit velocity=$V+V1$    (Equation 1)

In equation 1, V represents the target velocity of vehicle 1. In equation 1, V1 represents the value of increase in velocity. Value of increase in velocity V1 is set to travel control sections A and 120 by target vehicle velocity setting device 13. That is, travel control sections A and 120 calculate an upper limit velocity by adding value of increase in velocity V1 to target velocity V set by target vehicle velocity setting device 13.

The "lower limit velocity" illustrated in FIG. 5 indicates the lower limit velocity of vehicle 1 that travels in accordance with the travel schedule. The lower limit velocity is calculated on the basis of the following equation 2.

Lower limit velocity=$V-V2$    (Equation 2)

In equation 2, V represents the target velocity of vehicle 1. In equation 2, V2 represents the value of decrease in velocity. Value of decrease in velocity V2 is set to travel control sections A and 120 by target vehicle velocity setting device 13. That is, travel control sections A and 120 calculate a lower limit velocity by subtracting value of decrease in velocity V2 from target velocity V set by target vehicle velocity setting device 13. Value of increase in velocity V1 may be equal to value of decrease in velocity V2.

Velocity Cv1 illustrated in FIG. 5 indicates the velocity at which vehicle 1 is capable of passing through the first curved path. Velocity Cv2 indicates the velocity at which vehicle 1 is capable of passing through the second curved path. The second curved path has a smaller radius of curvature than the first curved path, and velocity Cv2 is lower than velocity Cv1. Velocities Cv1 and Cv2 are calculated by travel control sections A and 120.

Velocity Cv1 is calculated, for example, on the basis of the radius of curvature of the first curved path. Velocity Cv2 is calculated, for example, on the basis of the radius of curvature of the second curved path. Velocity Cv1 may be calculated on the basis of the radius of curvature of the first curved path, the weight of vehicle 1 (for example, the sum of the weight of the vehicle and the load thereof), and the gradient of the first curved path. Velocity Cv2 may be calculated, for example, on the basis of the radius of curvature of the second curved path, the weight of vehicle 1, and the gradient of the second curved path.

Travel control performed on vehicle 1 by travel control section A will be described. On the straight road before the first curved path, travel control section A causes vehicle 1 to travel so as to maintain the target velocity.

When vehicle 1 has entered the first curved path, travel control section A causes vehicle 1 to decelerate on the curved path entrance side such that vehicle 1 is capable of passing through the first curved path (for example, such that vehicle 1 is capable of safely passing without causing overrun or the like). For example, travel control section A causes vehicle 1 to decelerate to velocity Cv1 as illustrated in the portion corresponding to brake BK1 of waveform W1.

After the deceleration of vehicle 1, travel control section A causes vehicle 1 to accelerate to the target velocity on the curved path exit side of the first curved path. For example, travel control section A causes vehicle 1 to accelerate to the target velocity as illustrated in the portion corresponding to acceleration AC1 of waveform W1.

After causing vehicle 1 to accelerate to the target velocity, travel control section A maintains the velocity at the target velocity until vehicle 1 enters the second curved path. For example, travel control section A maintains the velocity of vehicle 1 at the target velocity as illustrated in the portion corresponding to constant velocity S1 of waveform W1.

When vehicle 1 has entered the second curved path, travel control section A causes vehicle 1 to decelerate on the curved path entrance side such that vehicle 1 is capable of passing through the second curved path (for example, such that vehicle 1 is capable of safely passing without causing overrun or the like). For example, travel control section A causes vehicle 1 to decelerate to velocity Cv2 as illustrated in the portion corresponding to brake BK2 of waveform W1.

After the deceleration of vehicle 1, travel control section A causes vehicle 1 to accelerate to the target velocity by driven traveling on the curved path exit side of the second curved path. In this way, travel control section A controls traveling of vehicle 1 in the first curved path and the second curved path.

After the deceleration in the first curved path, travel control section A causes vehicle 1 to accelerate to the target velocity by driven traveling even if the road has a downward slope (see the portion corresponding to acceleration AC1 of waveform W1). Thus, vehicle 1 consumes energy (for example, fuel or the like) due to the acceleration based on the driven traveling. In particular, although velocity Cv2 at which vehicle 1 is capable of passing through the second curved path is lower than velocity Cv1 at which vehicle 1 is capable of passing through the first curved path, travel control section A causes vehicle 1 that has decelerated to velocity Cv1 to accelerate to the target velocity by driven traveling and then to decelerate to velocity Cv2.

In contrast to this, travel control section 120 according to the present disclosure causes vehicle 1 to accelerate by N coasting from the curved path exit side of the first curved path, as described blow. Accordingly, vehicle 1 prevents energy consumption of acceleration based on driven traveling.

Hereinafter, travel control section 120 will be described. On the straight road before the first curved path, travel control section 120 causes vehicle 1 to travel so as to maintain the target velocity.

When vehicle 1 has entered the first curved path, travel control section 120 causes vehicle 1 to decelerate on the curved path entrance side such that vehicle 1 is capable of passing through the first curved path. For example, travel control section 120 causes vehicle 1 to decelerate to velocity Cv1 as illustrated in the portion corresponding to brake BK11 of waveform W2.

After the deceleration of vehicle 1, travel control section 120 causes vehicle 1 to perform N coasting on the curved path exit side of the first curved path. Because the first curved path and the second curved path have a downward slope, vehicle 1 accelerates. For example, travel control section 120 causes vehicle 1 to accelerate by N coasting as illustrated in the portion corresponding to downward slope DH1 of waveform W2.

When vehicle 1 has entered the second curved path, travel control section 120 causes vehicle 1 to decelerate on the curved path entrance side such that vehicle 1 is capable of passing through the second curved path. For example, in a case where the velocity of vehicle 1 is higher than velocity Cv2 at which vehicle 1 is capable of passing through the second curved path, travel control section 120 causes vehicle 1 to decelerate to velocity Cv2 as illustrated in the portion corresponding to brake BK12 of waveform W2.

After the deceleration of vehicle 1, travel control section 120 causes vehicle 1 to accelerate to the target velocity by coasting traveling on the curved path exit side of the second curved path. In this way, travel control section 120 controls traveling of vehicle 1 in the first curved path and the second curved path.

As described above, travel control section 120 causes vehicle 1 to decelerate on the curved path entrance side of the first curved path, and then causes vehicle 1 to perform N coasting on the curved path exit side of the first curved path (see the portion corresponding to downward slope DH1 of waveform W2). In this way, vehicle 1 does not perform acceleration based on driven traveling, and is thus capable of reducing energy consumption.

The velocity of vehicle 1 may exceed the upper limit velocity depending on the downward gradients of the first curved path and the second curved path. For example, in a case where the downward gradients are steep, the velocity of vehicle 1 may exceed the upper limit velocity. In this case, travel control section 120 causes vehicle 1 to decelerate such that the velocity of vehicle 1 does not exceed the upper limit velocity.

The velocity of vehicle 1 may not reach velocity Cv2 depending on the downward gradients of the first curved path and the second curved path. For example, in a case where the downward gradients are moderate, the velocity of vehicle 1 may not reach velocity Cv2. In this case, travel control section 120 causes vehicle 1 to accelerate to over velocity Cv2 by driven traveling and then causes vehicle 1 to perform N coasting.

FIG. 5 also illustrates waveform W3 of the vehicle velocity in a case where the first curved path and the second curved path have an upward slope. In the case of an upward slope, travel control section 120 controls traveling of vehicle 1 such that the velocity of vehicle 1 becomes velocity Cv2 with constant acceleration.

In the example in FIG. 5, velocities Cv1 and Cv2 are between the upper limit velocity and the lower limit velocity, but may be below the lower limit velocity in some cases.

Figure 6:
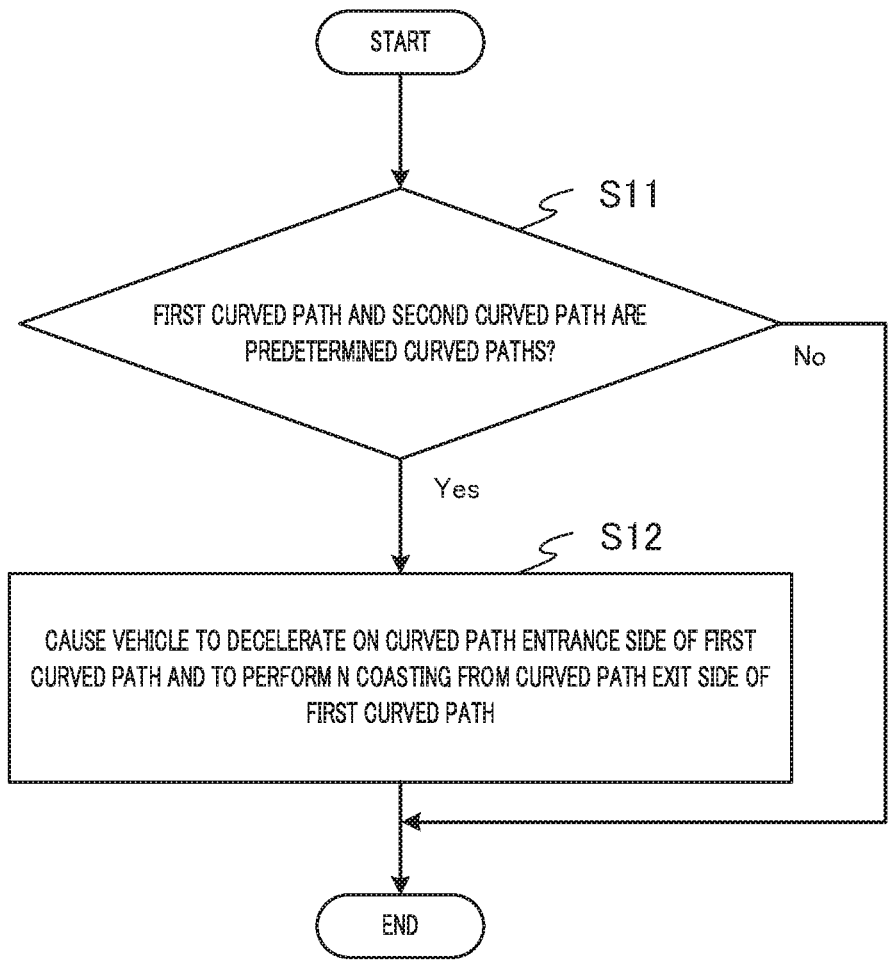
FIG. 6 is a flowchart illustrating an example of the operation of the travel control device.

FIG. 6 is a flowchart illustrating an example of the operation of travel control device 100. Travel control device 100 repeatedly executes the process of the flowchart illustrated in FIG. 6, for example, in a predetermined cycle.

Road determining section 110 determines whether or not a road on which vehicle 1 is to travel and which includes a downward slope includes a first cured path and a second curved path that has a smaller radius of curvature than the first curved path (step S11).

In a case where road determining section 110 determines in step S11 that the road on which vehicle 1 is to travel and which includes a downward slope includes the first curved path and the second curved path that has a smaller radius of curvature than the first curved path ("Yes" in S11), travel control section 120 causes vehicle 1, vehicle 1 being caused to travel so as to maintain a target velocity, to decelerate on the curved path entrance side such that vehicle 1 passes through the first curved path. Subsequently, travel control section 120 causes vehicle 1 to accelerate by N coasting from the curved path exit side of the first curved path (step S12).

On the other hand, in a case where road determining section 110 determines in step S11 that the road on which vehicle 1 is to travel and which includes a downward slope does not include the first curved path or the second curved path that has a smaller radius of curvature than the first curved path ("No" in S11), the process of the flowchart ends.

As described above, travel control device 100 includes road determining section 110 that determines whether or not a road on which vehicle 1 is to travel and which includes a downward slope includes a first curved path and a second curved path; and travel control section 120 that, in a case where road determining section 110 determines that the road includes the first curved path and the second curved path, causes vehicle 1, vehicle 1 being caused to travel so as to maintain a target velocity, to decelerate on a curved path entrance side of the first curved path such that vehicle 1 is capable of passing through the first curved path and causes vehicle 1 to perform coasting traveling from a curved path exit side of the first curved path.

According to travel control device 100 having such a configuration, vehicle 1 accelerates by using N coasting to pass through the second curved path and is thus capable of preventing wasteful energy consumption and realizing fuel-efficient traveling.

The first curved path may have a curved path entrance that is horizontal or sloping upward. That is, it is sufficient that the first curved path have a downward slope on the curved path exit side. In a case where the first curved path has a downward slope on the curved path exit side, vehicle 1 is capable of accelerating by N coasting.

A straight road of several meters may be included between the first curved path and the second curved path. The curved path exit side of the first curved path or the second curved path may include an upward slope or a flat road (for example, a moderate upward slope or flat road of several meters) that does not require acceleration by driven traveling.

The above-described embodiment is merely an example of concretization for carrying out the present disclosure, and the technical scope of the present disclosure should not be interpreted in a manner limited thereby. That is, the present disclosure can be carried out in various forms without deviating from the gist or main features of the present disclosure.

This application is based on Japanese Patent Application No 2017-198766 filed on Oct. 12, 2017, which is incorporated herein by reference in its entirety.

INDUSTRIAL APPLICABILITY

The present disclosure is useful as a travel control device, a vehicle, and a travel control method that are capable of realizing fuel-efficient traveling of a vehicle.

REFERENCE SIGNS LIST

1 Vehicle
2 Autonomous travel device
3 Engine
4 Clutch
5 Gearbox
6 Thrust shaft
7 Differential device
8 Driving shaft
9 Wheel
10 Engine ECU
11 Power transmission ECU
13 Target vehicle velocity setting device
14 Value-of-increase/decrease setting device
20 Travel condition obtaining device
21 Present position obtaining device
22 Weather obtaining device
23 Surroundings sensor
30 Vehicle information obtaining device
31 Accelerator sensor
32 Brake switch
33 Shift lever
34 Turn signal switch
35 Vehicle velocity sensor
40 Brake device
41 Foot brake
42 Retarder
43 Auxiliary brake
100 Travel control device
110 Road determining section
120 Travel control section

What is claimed is:

1. A travel control device, comprising:
a road determiner that:
communicably connects to a travel condition obtaining device configured to obtain a position of a vehicle, and
determines whether a road on which the vehicle is to travel includes a downward slope and the downward slope includes successive curved paths including a first curved path and a second curved path being directly connected to the first curved path, based on the position of the vehicle output from the travel condition obtaining device; and
a travel controller that communicably connects to an engine control unit, and in a case where the road determiner determines that the road includes the downward slope and the downward slope includes the successive curved paths, controls the engine control unit to:
causes the vehicle, which has been maintaining a target velocity, to decelerate on a curved path entrance side of the first curved path such that the vehicle is capable of passing through the first curved path, and
causes the vehicle to start coasting traveling from a curved path exit side of the first curved path, the engine control unit being configured to control an output of a power source of the vehicle and perform switching between connection and disconnection of a power transmission path from the power source to wheels of the vehicle.

2. The travel control device according to claim 1, wherein the second curved path has a smaller radius of curvature than the first curved path.

3. The travel control device according to claim 1, wherein the travel controller communicably connects to a brake device configured to perform a brake control of the vehicle, and
in a case where the vehicle has, on a curved path entrance side of the second curved path, a velocity higher than a velocity at which the vehicle is capable of passing through the second curved path, the travel controller controls the brake device to causes the vehicle to decelerate on the curved path entrance side of the second curved path.

4. The travel control device according to claim 1, wherein in a case where the vehicle has, on a curved path entrance side of the second curved path, a velocity lower than a velocity at which the vehicle is capable of passing through the second curved path, the travel controller controls the engine control unit such that when the vehicle travels on the curved path exit side of the first curved path, the engine control unit causes the vehicle to accelerate by driven traveling and then causes the vehicle to perform the coasting traveling.

5. A vehicle, comprising the travel control device according to claim 1.

6. A travel control method, comprising:
determining whether a road on which a vehicle is to travel includes a downward slope and the downward slope includes successive curved paths including a first curved path and a second curved path being directly connected to the first curved path; and
in a case where it is determined that the road includes the downward slope and the downward slope includes the successive curved paths, causing the vehicle which has been maintaining a target velocity, to decelerate on a curved path entrance side of the first curved path such that the vehicle is capable of passing through the first curved path, and causing the vehicle to start coasting traveling from a curved path exit side of the first curved path.

* * * * *